(12) United States Patent
Romig et al.

(10) Patent No.: US 8,959,925 B2
(45) Date of Patent: Feb. 24, 2015

(54) COMBUSTOR RECOVERY METHOD AND SYSTEM

(75) Inventors: Bryan Wesley Romig, Simpsonville, SC (US); Derrick Walter Simons, Greer, SC (US); Venkat Narra, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 615 days.

(21) Appl. No.: 13/352,496

(22) Filed: Jan. 18, 2012

(65) Prior Publication Data

US 2013/0180260 A1   Jul. 18, 2013

(51) Int. Cl.
| | |
|---|---|
| F02C 7/22 | (2006.01) |
| F02C 7/26 | (2006.01) |
| F02C 7/264 | (2006.01) |
| F02G 1/055 | (2006.01) |
| F02G 3/00 | (2006.01) |
| F02C 9/00 | (2006.01) |
| F02C 3/00 | (2006.01) |
| F02C 1/00 | (2006.01) |

(52) U.S. Cl.
USPC ........... 60/776; 60/39.821; 60/39.27; 60/772; 60/773; 60/778; 60/39.37

(58) Field of Classification Search
CPC .................................. F02C 7/262; F02C 7/26
USPC ............ 60/39.821, 39.37, 776, 772, 773, 778
See application file for complete search history.

(56) References Cited

U.S. PATENT DOCUMENTS

| | | | | |
|---|---|---|---|---|
| 4,249,372 A | * | 2/1981 | White | 60/796 |
| 4,625,510 A | * | 12/1986 | Evans | 60/792 |
| 5,404,709 A | * | 4/1995 | MacLean et al. | 60/778 |
| 5,722,230 A | * | 3/1998 | Cohen et al. | 60/39.37 |
| 6,274,945 B1 | * | 8/2001 | Gilbreth et al. | 290/52 |
| 6,334,294 B1 | | 1/2002 | Belsom et al. | |
| 7,389,643 B2 | | 6/2008 | Simons et al. | |
| 7,593,803 B2 | | 9/2009 | Healy et al. | |
| 7,917,278 B2 | | 3/2011 | Mulera et al. | |
| 2004/0045273 A1 | * | 3/2004 | Bland | 60/39.37 |
| 2004/0206091 A1 | * | 10/2004 | Yee et al. | 60/777 |
| 2008/0295521 A1 | | 12/2008 | Simons et al. | |
| 2011/0036094 A1 | | 2/2011 | Demougeot et al. | |

* cited by examiner

Primary Examiner — Gerald L Sung
Assistant Examiner — Eric Linderman
(74) Attorney, Agent, or Firm — McNees Wallace & Nurick LLC

(57) ABSTRACT

A method is disclosed for controlling gas turbine operation in response to lean blowout of a combustion can. The gas turbine comprises a pair of combustion cans. The method includes sensing that a first combustion can is extinguished during a full load operation of the gas turbine, adjusting a fuel ratio between the fuel nozzles in each can, delivering a richer fuel mixture to the fuel nozzles nearest to the cross-fire tubes, generating a cross-fire from the second combustion can to the first combustion can, detecting a recovery of the turbine load, and adjusting the fuel ratio to the normal balanced fuel distribution between the fuel nozzles in each can.

19 Claims, 4 Drawing Sheets

COMBUSTOR RECOVERY METHOD AND SYSTEM

FIELD OF THE INVENTION

The present invention relates generally to controllers for a combustion system for a gas turbine. More specifically the invention relates to a method for a reigniting a turbine combustor operating at full load through the implementation of a controls algorithm.

BACKGROUND OF THE INVENTION

Industrial and power generation gas turbines have control systems or controllers that monitor and control the operation of the gas turbine. These controllers govern the combustion system of the gas turbine. Gas turbines require precise fuel delivery to achieve fuel-lean homogenous mixing of the fuel and air in each local combustion zone, which is necessary to operate at required low emission levels. Gas turbines must maintain an operating margin above a lean blowout limit. Finely tuned control of local combustion is necessary to maintain flame stability in the turbine combustors without compromising performance in advanced turbines.

In the current gas turbines, if one combustor, or combustion can. loses flame, then the exhaust thermocouples recognize the elevated temperature differences between the extinguished combustion can and the other combustion cans, and the control system reacts by shutting down the turbine. Such controls may result in a prolonged outage and the loss of operating time and revenue. In current gas turbine control systems certain signals can be used to detect an extinguished combustion can that are faster than the exhaust thermocouple signals, due to the relatively slow nature of the transport delay time from the combustion can to the exhaust thermocouple, and the subsequent heat transfer and temperature change in the thermocouple.

When the load drop is detected the gas turbine, under the current control system, the control system will deliver more fuel into the system to try to increase load. When a combustion can blows out, or its flame is extinguished, fuel nozzles that are nearest to the cross-fire tubes are operating fuel lean and their flame is weak and positioned further downstream of the cross-fire tube. Delivering more fuel into the combustion can in this state may be inadequate to promote cross-fire into the extinguished combustor can. However, adjusting the divisions of fuel and enriching the fuel mixture in the fuel nozzles will promote cross-fire into the unlit combustion can.

An algorithm is needed so that the control system may perform a fuel adjustment very rapidly, such that cross-fire occurs to ignite the extinguished combustion can, and at the same time span is short enough to minimize the impact in the operation or emissions of the gas turbine.

What is needed is a controller that detects an extinguished combustion can using a faster signal, e.g., load, within that transport delay time, modulate the division of fuel between combustion fuel nozzles in each combustion can and hold until the controller detects a load recovery.

SUMMARY OF THE INVENTION

In one embodiment there is disclosed a method of controlling gas turbine operation in response to lean blowout of a combustion can. The gas turbine comprises at least two combustion cans and the method includes the steps of sensing that a first combustion can is extinguished during a full load operation of the gas turbine; adjusting a fuel ratio between the fuel nozzles, enriching the fuel ratio in the fuel nozzles closest to the cross-fire tubes; generating a cross-fire from the second combustion can to the first combustion can; detecting a recovery of the turbine load; and adjusting the fuel ratio to the normal balanced fuel distribution between the first combustion can and the second combustion can.

In another embodiment a control system for a gas turbine is disclosed. The control system includes a compressor, two or more combustion cans, a turbine drivingly coupled to the compressor, and a control system. The control system also includes a controller. The controller is programmed to sense a first combustion can being extinguished during a full load operation of the gas turbine; adjust a fuel ratio between the fuel nozzles to deliver a richer fuel mixture to the nozzles closest to the cross-fire tubes; generate a cross-fire from the second combustion can to the first combustion can; detect a recovery of the turbine load; and adjust the fuel ratio to the normal balanced fuel distribution between the fuel nozzles.

In yet another embodiment, a computer program product is disclosed which is embodied on a non-transitory computer readable medium and executable by a microprocessor controller for determining a lean blowout of a combustion can of a gas turbine engine. The computer program product includes instructions to sense a first combustion can being extinguished during a full load operation of the gas turbine; adjust a fuel ratio between the fuel nozzles to deliver increase a fuel mixture to at least one fuel nozzle adjacent a cross-fire tube in communication with the first combustion can; generate a flame from the second combustion can to the first combustion can via the cross-fire tube; detect a recovery of the turbine load; and adjust the fuel ratio to the normal balanced fuel distribution between the fuel nozzles.

An advantage of the disclosed method is the ability for low emissions units that run with less margin to lean blowout to operate more reliably.

Another advantage of the disclosed method and system is to also increase the reliability by preventing turbine machinery from going offline, which is very important, e.g., to liquified natural gas (LNG) train applications where the gas turbines are required to be operating continuously for LNG production.

Still another advantage is the ability to rapidly modulate fuel flow between a plurality of fuel nozzles to reignite an adjacent combustion can before the gas turbine trips due to elevated temperature differences between combustion cans.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
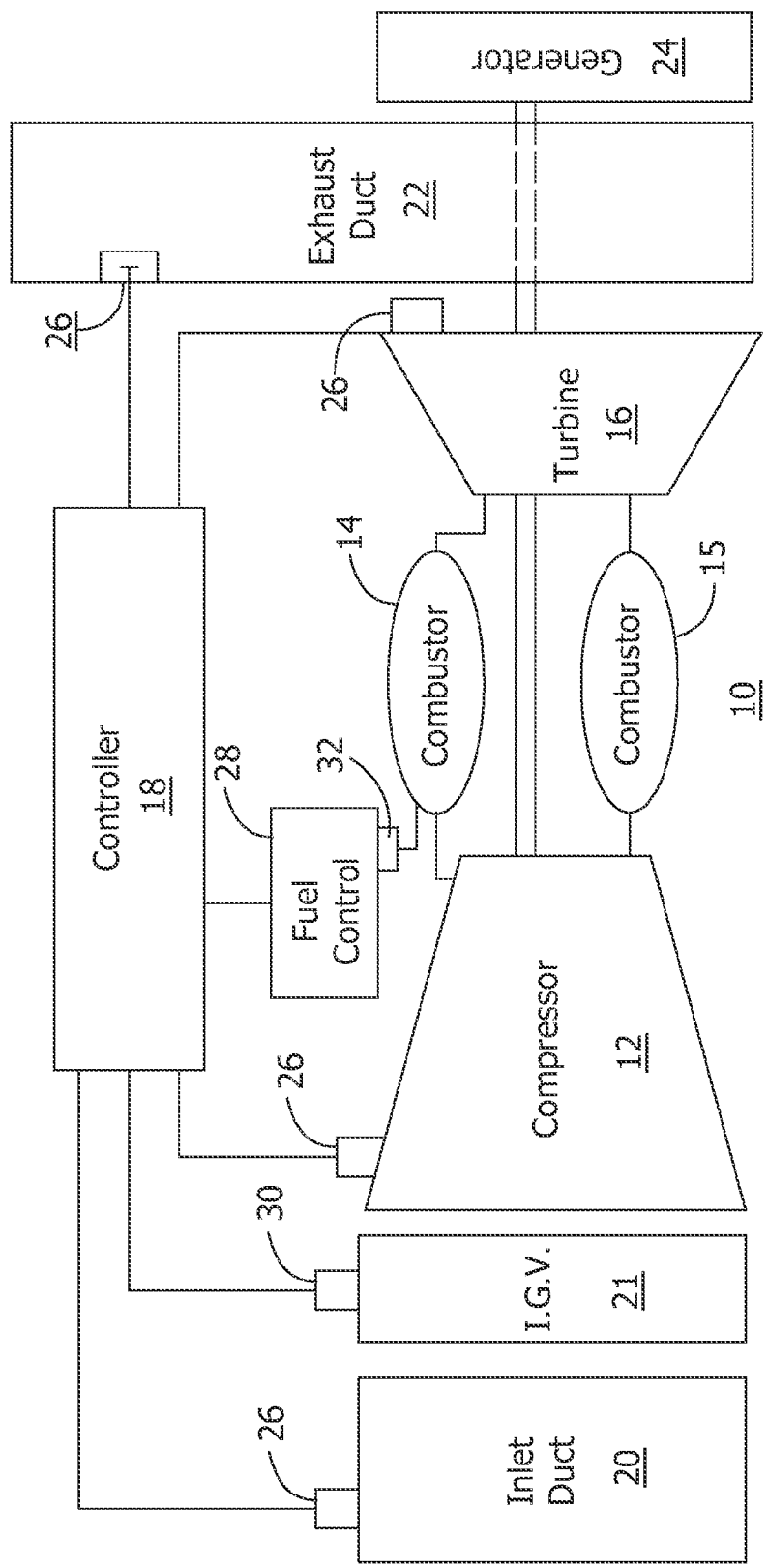
FIG. 1 shows a schematic diagram of an exemplary embodiment of a gas turbine having a fuel control system.

FIG. 1 depicts a gas turbine 10 having a compressor 12, a pair of combustors or combustion cans 14, 15, turbine 16 drivingly coupled to the compressor, and a control system (controller) 18. An inlet duct 20 to the compressor feeds ambient air and possibly injected water to the compressor. The inlet duct may have ducts, filters, screens and sound absorbing devices that contribute to a pressure loss of ambient air flowing through the inlet 20 into inlet guide vanes 21 of the compressor. An exhaust duct 22 for the turbine directs combustion gases from the outlet of the turbine through, for example, emission control and sound absorbing devices. The exhaust duct 22 may include sound adsorbing materials and emission control devices that apply a backpressure to the turbine. The amount of inlet pressure loss and back pressure may vary over time due to the addition of components to the ducts 20, 22, and to dust and dirt clogging the inlet and exhaust ducts. The turbine 16 may drive a generator 24 that produces electrical power. The inlet loss to the compressor and the turbine exhaust pressure loss tend to be a function of corrected flow through the gas turbine. Further, the amount of inlet loss and turbine back pressure may vary with the flow rate through the gas turbine.

The operation of the gas turbine may be monitored by several sensors 26 detecting various conditions of the turbine, generator and ambient environment. For example, temperature sensors 26 may monitor ambient temperature surrounding the gas turbine, compressor discharge temperature, turbine exhaust gas temperature, and other temperature measurements of the gas stream through the gas turbine. Pressure sensors 26 may monitor ambient pressure, and static and dynamic pressure levels at the compressor inlet and outlet, turbine exhaust, at other locations in the gas stream through the gas turbine. Humidity sensors 26, e.g., wet and dry bulb thermometers, measure ambient humidity in the inlet duct of the compressor. The sensors 26 may also comprise flow sensors, speed sensors, flame detector sensors, valve position sensors, guide vane angle sensors, or the like that sense various parameters pertinent to the operation of gas turbine 10. As used herein, "parameters" refer to items that can be used to define the operating conditions of turbine, such as temperatures, pressures, and gas flows at defined locations in the turbine. These parameters can be used to represent a given turbine operating condition.

A fuel control system 28 regulates the fuel flowing from a fuel supply to the combustion can 14, and the ratio between the fuel flowing into primary and secondary fuel nozzles, and the fuel mixed with secondary air flowing into a combustion chamber. The fuel controller may also select the type of fuel for the combustion can. The fuel control system 28 may be a separate unit or may be a component of a larger controller 18. The fuel control system may also generate and implement fuel ratio commands that determine the portion of fuel flowing to primary fuel nozzles and the portion of fuel flowing to secondary fuel nozzles.

The controller 18 may be, e.g., one of the General Electric SPEEDTRONIC™ Gas Turbine Control System models Mark V, Mark Ve, Mark VI or Mark VIe, such as is described in Rowen, W. I., "SPEEDTRONIC™ Mark V Gas Turbine Control System", GE-3658D, published by GE Industrial & Power Systems of Schenectady, N.Y. The controller 18 may be a computer system having a processor(s) that executes programs to control the operation of the gas turbine using sensor inputs and instructions from human operators. The programs executed by the controller 18 may include scheduling algorithms for regulating fuel flow to the combustion can 14. The commands generated by the controller cause actuators on the gas turbine to, for example, adjust valves (actuator 32) between the fuel supply and combustion cans that regulate the flow, fuel division and type of fuel flowing to the combustion cans; adjust inlet guide vanes 21 (actuator 30) on the compressor, and activate other control settings on the gas turbine.

The controller 18 regulates the gas turbine based, in part, on algorithms stored in computer memory associated with the controller. If while in operation, the control system detects a change in operating load through the use of signals that are quickly detected, e.g., megawatts, the control system may modulate the fuel division between combustion cans to cross fire flame from a lit combustion can to the extinguished combustion can. Once the controller recognizes that the extinguished combustion can has recovered flame, the controller adjusts the fuel division between combustion cans to the turbine nominal operating value. The speed at which the re-ignition process occurs is key. If the combustion can does not reignite quickly enough then the control system with receive an indication of a high temperature difference from exhaust thermocouples, due to the extinguished combustion can, and cause the gas turbine to trip. However, should the combustion can reignite, the control system will sense the recovery of the thermocouple measurements to a normal distribution, ignore the high temperature differences indicated by the exhaust thermocouples prior to recovery, and the turbine will return to normal operation. If the controller determines that the combustion can has not reignited, then the controller will accept the high temperature spread limit and trip the turbine.

Figure 2:
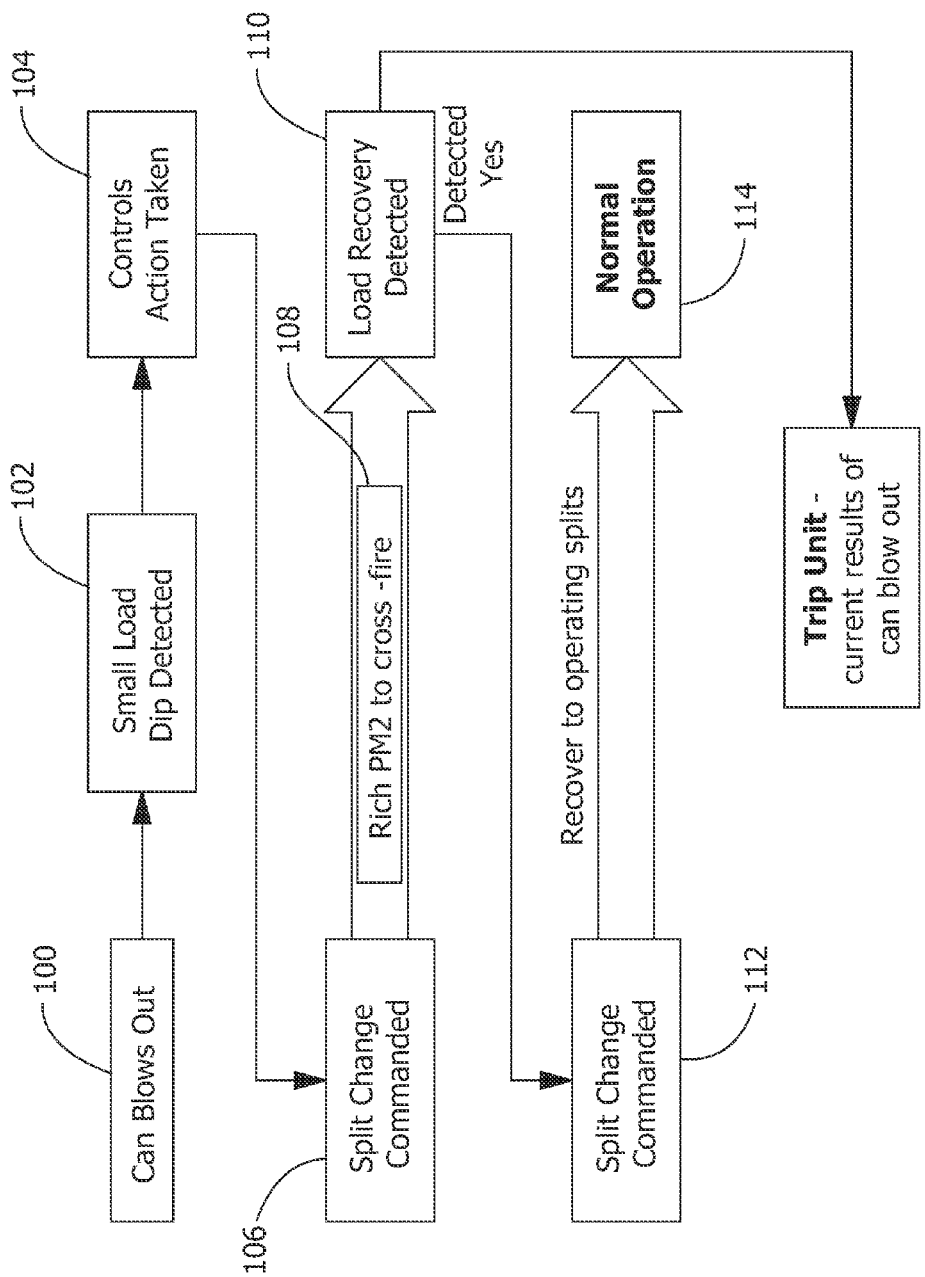
FIG. 2 shows a flow diagram of an embodiment of the combustion can ignition recovery system.

Referring to FIG. 2, an exemplary embodiment of a method for controlling reignition of an extinguished combustion can at full load is shown. During full load operation of gas turbine 10, at step 100, a combustion can 14 is extinguished. Next, at step 102, a slight decrease in the operating load is detected by controller 18. At step 104, controller 18 reacts to the sensed upset or decrease in the operating load by initiating the reignition steps. Next, at step 106, controller 18 generates a command to adjust the fuel division between combustion cans 14, 15, to deliver a richer fuel mixture to an operating combustion can 15. The introduction of the richer fuel mixture to operating combustion can 15 generates a cross-fire flame that causes the flame from the operating combustion can 15 to bridge across to the extinguished combustion can 14 through crossfire tube 11 (FIG. 3), at step 108. Next, at step 110, after a brief interval, the control system senses the load sharing to determine if the load is again balanced, indicating that load recovery is detected. If the load recovery is detected at step 110, then controller 18 generates a signal (step 112) to adjust the fuel division to the normal balanced fuel distribution (step 114) between combustion fuel nozzles 14, 15.

Figure 3:
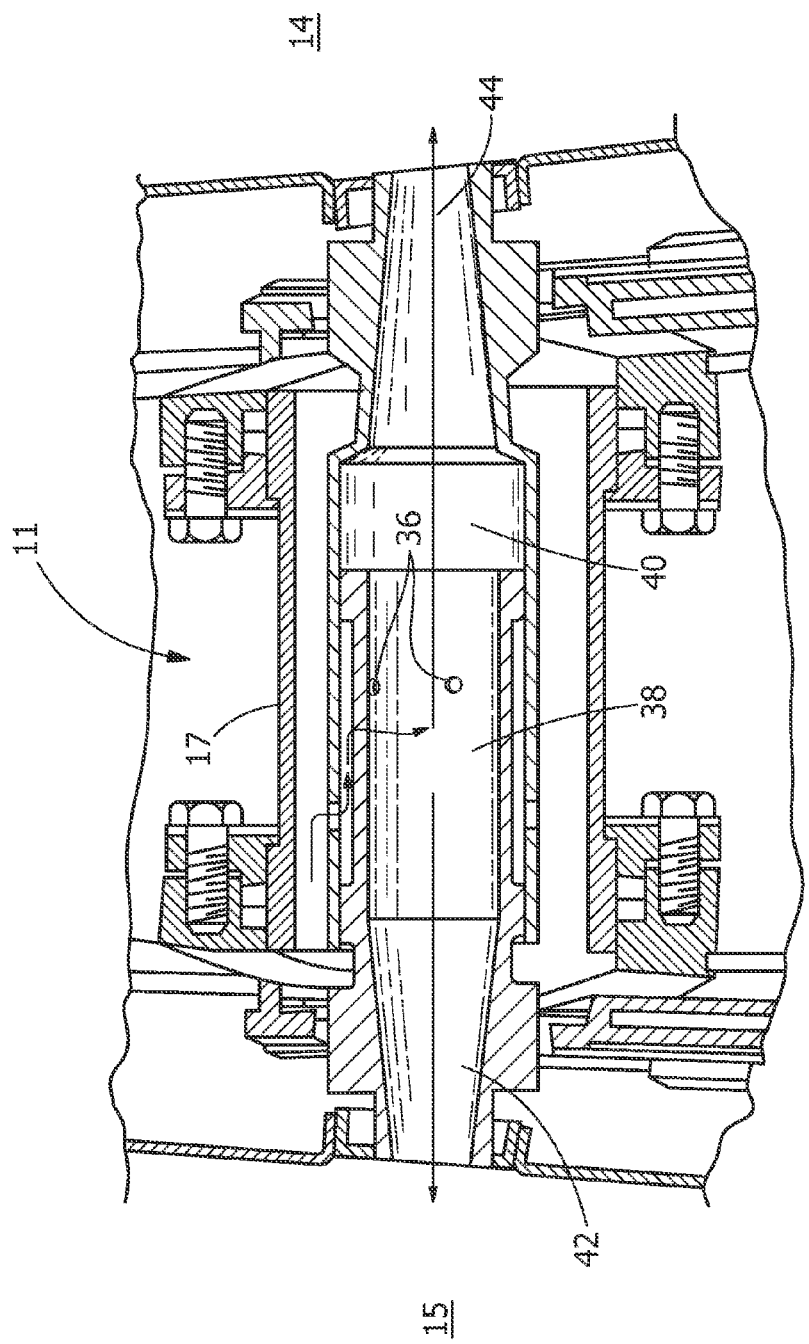
FIG. 3 shows an exemplary crossfire tube connected between combustion cans of a gas turbine.

Crossfire tubes are well-known in the art. Referring next to FIG. 3, an exemplary crossfire tube configuration is shown. The crossfire tube 11 extends between first combustion can 14 and second combustor 15, and is surrounded by a vessel 17 that is open to the flow of compressor discharge air. Crossfire tube 11 may comprise a pair of tapered tubular sections 38, 40, joined in a telescoping relationship. A plurality of purge air feed holes 36 are drilled in the section 38 adjacent the telescoping joint with section 40. Tubular sections 38 and 40 taper from a larger diameter in the mid-section of the crossfire tube, to smaller diameters at the ends 42, 44, respectively, where the ends are joined to the combustion cans 14 and 15. The taper at the ends of crossfire tube 11 causes the purge air flow to accelerate and be forced against the tube walls so that the purge air fills the entire cross section of the opposite ends of the tube.

Figure 4:
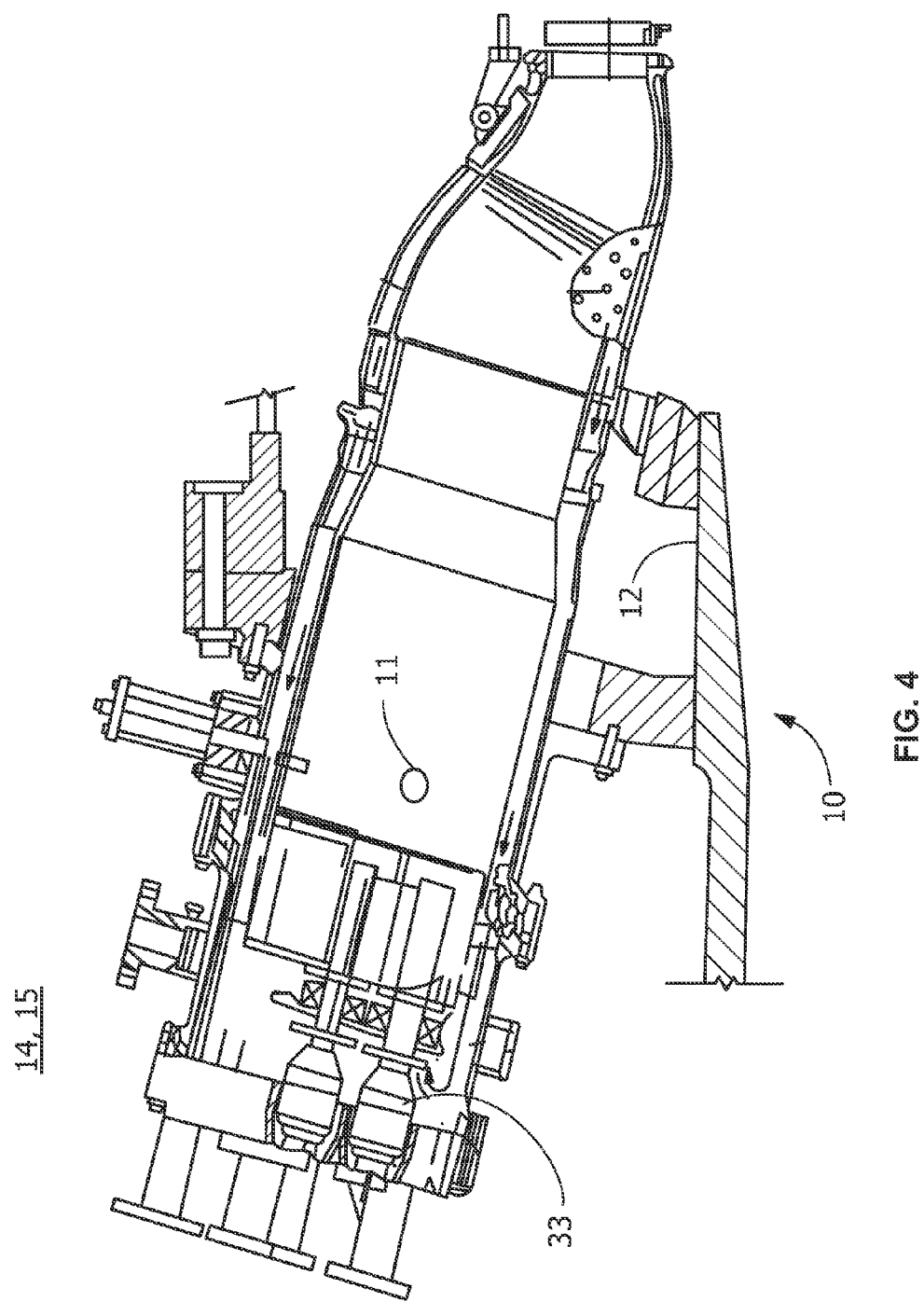
FIG. 4 shows a partial sectional view of an exemplary multi-burner combustion can.

FIG. 4 shows an exemplary combustion can 14, 15. Crossfire tube 11 is positioned through the wall of the combustion can 14, 15 ahead of fuel nozzles 33. Crossfire tube 11 may be connected to an adjacent combustion can 14, 15. Combustion can 11 may have multiple nozzles 33 and/or crossfire tubes 11.

As noted above, embodiments within the scope of the present application include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The technical effects of some configurations of the present invention include the ability for low emissions turbine units to operate more reliably, preventing turbine machinery from going offline and rapid modulation of fuel flow between a plurality of fuel nozzles to reignite an adjacent combustion can before the gas turbine trips.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of controlling gas turbine operation in response to lean blowout of a combustion can, wherein a gas turbine comprises at least two combustion cans, a first combustion can comprising a first plurality of fuel nozzles; a second combustion can comprising a second plurality of fuel nozzles; the method comprising:

sensing that the first combustion can is extinguished during a full load operation of the gas turbine;

adjusting a fuel ratio between at least one of the first plurality of fuel nozzles in the first combustion can and at least one of the second plurality of fuel nozzles in the second combustion can;

delivering a richer fuel mixture to the at least one of the second plurality of fuel nozzles wherein the at least one of the second plurality of fuel nozzles is a fuel nozzle nearest to a cross-fire tube;

generating a cross-fire from the second combustion can to the first combustion can via the cross-fire tube;

detecting a recovery of the full load operation of the gas turbine; and adjusting the fuel ratio to a balanced fuel distribution between the first and second plurality of fuel nozzles.

2. The method of claim 1, wherein the step of adjusting a fuel ratio further comprises:

in response to sensing a decrease in an operating load, initiating reignition.

3. The method of claim 1, wherein the step of adjusting a fuel ratio further comprises generating a command by a controller to adjust the fuel ratio between the first and second plurality of fuel nozzles.

4. The method of claim 1, wherein the step of generating a cross-fire further comprises:

causing flame from the second combustion can to bridge across to the first combustion can to reignite the first combustion can.

5. The method of claim 1, further comprising waiting a an interval, and sensing a load recovery.

6. The method of claim 1, wherein the step of adjusting the fuel ratio to the balanced fuel distribution between combustion fuel nozzles further comprises generating a signal from a controller to return the fuel ratio to the balanced fuel distribution.

7. A method as set forth in claim 1, wherein each step is performed automatically.

8. A control system for a gas turbine comprising:

a compressor, a turbine drivingly coupled to the compressor, a control system; a first combustion can comprising a first plurality of fuel nozzles; and a second combustion can comprising a second plurality of fuel nozzles;

the control system further comprising a controller configured to:

sense the first combustion can being extinguished during a full load operation of the gas turbine;

adjust a fuel ratio between at least one of the first plurality of fuel nozzles in the first combustion can and at least one of the second plurality of fuel nozzles in the second combustion can;

deliver a richer fuel mixture to the at least one of the second plurality of fuel nozzles wherein the at least one of the second plurality of fuel nozzles is a fuel nozzle nearest to a cross-fire tube in communication with the first combustion can;

generate a cross-fire from the second combustion can to the first combustion can;

detect a recovery of the full load operation of the gas turbine;

adjust the fuel ratio to a balanced fuel distribution between the first and second plurality of fuel nozzles; and in response to sensing an imbalance in an operating load, initiating reignition.

9. The system of claim 8, wherein the controller is further configured to generate a command to adjust the fuel ratio between the first and second plurality of fuel nozzles.

10. The system of claim 8, wherein the controller is further configured to generate a cross-fire by inducing flame from the second combustion can to bridge across to the first combustion can to reignite the first combustion can.

11. The system of claim 8, wherein the controller is further configured to pause for an interval, sense a turbine parameter, and determine if the operating load has recovered.

12. The system of claim 8, wherein the controller is further configured to generate a signal from the controller to distribute the fuel equally between combustion cans.

13. The system of claim 11, wherein the turbine parameter comprises temperatures, pressures, and gas flows at predetermined locations in the turbine.

14. The system of claim 13, wherein the turbine parameter represents a given turbine operating condition.

15. The system of claim 8, wherein the control system further comprises a fuel control system; the fuel control system configured to regulate at least one of: fuel flowing from a fuel supply to the first combustion can and the second combustion can, the division of fuel flow between the first and second plurality of fuel nozzles, and a fuel mixed with air flowing into the second combustion can.

16. The control system of claim 8, wherein the control system is configured to generate and implement fuel ratio commands that determine a portion of fuel flowing to the first plurality of fuel nozzles and a portion of fuel flowing to the second plurality of fuel nozzles.

17. A computer program product embodied on a non-transitory computer readable medium and executable by a microprocessor controller for determining a lean blowout of a combustion can of a gas turbine engine the gas turbine comprising at least a first combustion can comprising a first plurality of fuel nozzles and a second combustion can comprising a second plurality of fuel nozzles; the computer program product comprising instructions to:
- sense the first combustion can being extinguished during a full load operation of the gas turbine;
- adjust a fuel ratio between at least one of the first plurality of fuel nozzles in the first combustion can and at least one of the second plurality of fuel nozzles in the second combustion can;
- deliver a richer fuel mixture to the at least one of the second plurality of fuel nozzles wherein the at least one of the second plurality of fuel nozzles is a fuel nozzle nearest to a cross-fire tube;
- generate a cross-fire from the second combustion can to the first combustion can;
- detect a recovery of the full load operation of the gas tubine; and
- adjust the fuel ratio to a balanced fuel distribution between the first and second plurality of fuel nozzles.

18. The computer program product of claim 17, further comprising instructions to: generate a cross-fire by inducing flame from the second combustion can to bridge across to the first combustion can to reignite the first combustion can.

19. The computer program product of claim 17, further comprising instructions to: pause for an interval, sense a turbine parameter, and determine if the shared load is approximately equal between the first combustion can and the second combustion can.

\* \* \* \* \*

UNITED STATES PATENT AND TRADEMARK OFFICE
CERTIFICATE OF CORRECTION

PATENT NO.       : 8,959,925 B2                                                Page 1 of 1
APPLICATION NO.  : 13/352496
DATED            : February 24, 2015
INVENTOR(S)      : Romig et al.

It is certified that error appears in the above-identified patent and that said Letters Patent is hereby corrected as shown below:

In the claims,

In Column 6, Line 30, in Claim 5, delete "waiting a an" and insert -- waiting an --, therefor.

In Column 6, Line 37, in Claim 7, delete "A method" and insert -- The method --, therefor.

In Column 8, Line 18, in Claim 17, delete "tubine;" and insert -- turbine; --, therefor.

Signed and Sealed this
Twenty-seventh Day of October, 2015

Michelle K. Lee
*Director of the United States Patent and Trademark Office*